(12) United States Patent
Zhao et al.

(10) Patent No.: US 12,518,455 B2
(45) Date of Patent: Jan. 6, 2026

(54) MACHINE LEARNING-BASED APPROACH FOR AUDIO-DRIVEN AVATAR ANIMATION OR OTHER FUNCTIONS

(71) Applicant: Samsung Electronics Co., Ltd., Suwon-si (KR)

(72) Inventors: Liang Zhao, Saratoga, CA (US); Siva Penke, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 280 days.

(21) Appl. No.: 18/299,248

(22) Filed: Apr. 12, 2023

(65) Prior Publication Data

US 2024/0203014 A1 Jun. 20, 2024

Related U.S. Application Data

(60) Provisional application No. 63/432,476, filed on Dec. 14, 2022.

(51) Int. Cl.
*G06T 13/20* (2011.01)
*G06T 13/40* (2011.01)
(Continued)

(52) U.S. Cl.
CPC ............ *G06T 13/205* (2013.01); *G06T 13/40* (2013.01); *G10L 17/02* (2013.01); *G10L 17/04* (2013.01); *G10L 17/18* (2013.01)

(58) Field of Classification Search
CPC ....... G06T 13/205; G06T 13/40; G10L 17/02; G10L 17/04; G10L 17/18; G10L 21/10; G10L 25/63; G10L 2021/105
(Continued)

(56) References Cited

U.S. PATENT DOCUMENTS 11,257,507 B2   2/2022  Garbacea et al.
12,112,573 B2 * 10/2024  Tay ..................... G06V 40/171
(Continued)

FOREIGN PATENT DOCUMENTS

WO       2022051497 A1    3/2022

OTHER PUBLICATIONS

International Search Report and Written Opinion of the International Searching Authority dated Feb. 13, 2024 in connection with International Patent Application No. PCT/KR2023/016316, 7 pages.

*Primary Examiner* — Sheree N Brown

(57) ABSTRACT

A method includes obtaining, using at least one processing device of an electronic device, an audio input associated with a speaker. The method also includes extracting, using a feature extractor of a trained machine learning model, audio features from the audio input. The method further includes generating (i) one or more content parameter predictions using content embeddings extracted by a content encoder and decoded by a content decoder of the trained machine learning model and (ii) one or more style parameter predictions using style embeddings extracted by a style encoder and decoded by a style decoder of the trained machine learning model. The content embeddings and the style embeddings are based on the audio features of the audio input. The trained machine learning model is trained to generate the one or more content parameter predictions and the one or more style parameter predictions using disentangled content and style embeddings.

20 Claims, 7 Drawing Sheets

(51) Int. Cl.
*G10L 17/02* (2013.01)
*G10L 17/04* (2013.01)
*G10L 17/18* (2013.01)

(58) Field of Classification Search
USPC ........................................................ 345/474
See application file for complete search history.

(56) References Cited

U.S. PATENT DOCUMENTS

| | | |
|---|---|---|
| 2019/0172243 A1 | 6/2019 | Mishra et al. |
| 2020/0311538 A1* | 10/2020 | Wu ........................ G06N 3/045 |
| 2021/0056980 A1* | 2/2021 | Gfeller ..................... G10L 25/51 |
| 2021/0192824 A1 | 6/2021 | Chen et al. |
| 2021/0374542 A1 | 12/2021 | Zhang et al. |
| 2022/0020356 A1* | 1/2022 | Wang ...................... G10L 13/10 |
| 2022/0044463 A1* | 2/2022 | Kang ..................... G10L 15/187 |
| 2022/0130376 A1 | 4/2022 | Meng et al. |
| 2022/0189456 A1 | 6/2022 | Pang et al. |
| 2022/0318505 A1* | 10/2022 | Pouran Ben Veyseh .................... G06F 40/126 |
| 2022/0392131 A1 | 12/2022 | Li et al. |
| 2023/0127652 A1* | 4/2023 | Pouran Ben Veyseh .................... G06N 3/0895  704/9 |
| 2024/0144568 A1* | 5/2024 | Gururani ................ G06N 3/045 |

\* cited by examiner ated by a style encoder and decoded by a style decoder of the trained machine learning model. The content embeddings and the style embeddings are based on the audio features of the audio input. The trained machine learning model is trained to generate the one or more content parameter predictions and the one or more style parameter predictions using disentangled content and style embeddings.

MACHINE LEARNING-BASED APPROACH FOR AUDIO-DRIVEN AVATAR ANIMATION OR OTHER FUNCTIONS

CROSS-REFERENCE TO RELATED APPLICATION AND PRIORITY CLAIM

This application claims priority under 35 U.S.C. § 119(e) to U.S. Provisional Patent Application No. 63/432,476 filed on Dec. 14, 2022. This provisional application is hereby incorporated by reference in its entirety.

TECHNICAL FIELD

This disclosure relates generally to machine learning. More specifically, this disclosure relates to a machine learning-based approach for audio-driven avatar animation or other functions.

BACKGROUND

Audio-driven three-dimensional (3D) avatar animation typically involves the generation and display of a 3D avatar or character having a face that moves while audio information imitating a voice is played to a user. Ideally, the movements of the character's mouth and other facial features match the playback of the audio information, thereby supporting effective lip syncing between the audio information and the facial animations. Audio-driven 3D avatar animation using deep learning models has shown great promise for providing realistic 3D facial animations on mobile devices, such as smartphones, smart watches, and tablet computers.

SUMMARY

This disclosure relates to a machine learning-based approach for audio-driven avatar animation or other functions.

In a first embodiment, a method includes obtaining, using at least one processing device of an electronic device, an audio input associated with a speaker. The method also includes extracting, using a feature extractor of a trained machine learning model, audio features from the audio input. The method further includes generating (i) one or more content parameter predictions using content embeddings extracted by a content encoder and decoded by a content decoder of the trained machine learning model and (ii) one or more style parameter predictions using style embeddings extracted by a style encoder and decoded by a style decoder of the trained machine learning model. The content embeddings and the style embeddings are based on the audio features of the audio input. The trained machine learning model is trained to generate the one or more content parameter predictions and the one or more style parameter predictions using disentangled content and style embeddings.

In a second embodiment, an electronic device includes at least one processing device configured to obtain an audio input associated with a speaker and extract audio features from the audio input using a feature extractor of a trained machine learning model. The at least one processing device is also configured to generate (i) one or more content parameter predictions using content embeddings extracted by a content encoder and decoded by a content decoder of the trained machine learning model and (ii) one or more style parameter predictions using style embeddings In a third embodiment, a method includes obtaining, using at least one processing device of an electronic device, audio samples of at least one training dataset. The method also includes training, using the at least one processing device, a machine learning model to generate content parameter predictions and style parameter predictions using the audio samples. Training the machine learning model includes generating audio features of the audio samples using a feature extractor of the machine learning model. Training the machine learning model also includes providing a first collection of the audio features as inputs to a content encoder of the machine learning model in order to generate first content embeddings and providing the first content embeddings as inputs to a style decoder of the machine learning model in order to generate first style parameter predictions. Training the machine learning model further includes providing the first collection of the audio features as inputs to a style encoder of the machine learning model in order to generate first style embeddings and providing the first style embeddings as inputs to a content decoder of the machine learning model in order to generate first content parameter predictions. In addition, training the machine learning model includes updating the machine learning model to maximize differences between ground truth content parameters and the first content parameter predictions and differences between ground truth style parameters and the first style parameter predictions.

Additional embodiments are also provided in accordance with this disclosure. For example, a non-transitory machine readable medium may contain instructions that when executed cause at least one processor to perform the method of the first embodiment or the method of the third embodiment. As another example, an electronic device may include at least one processing device configured to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
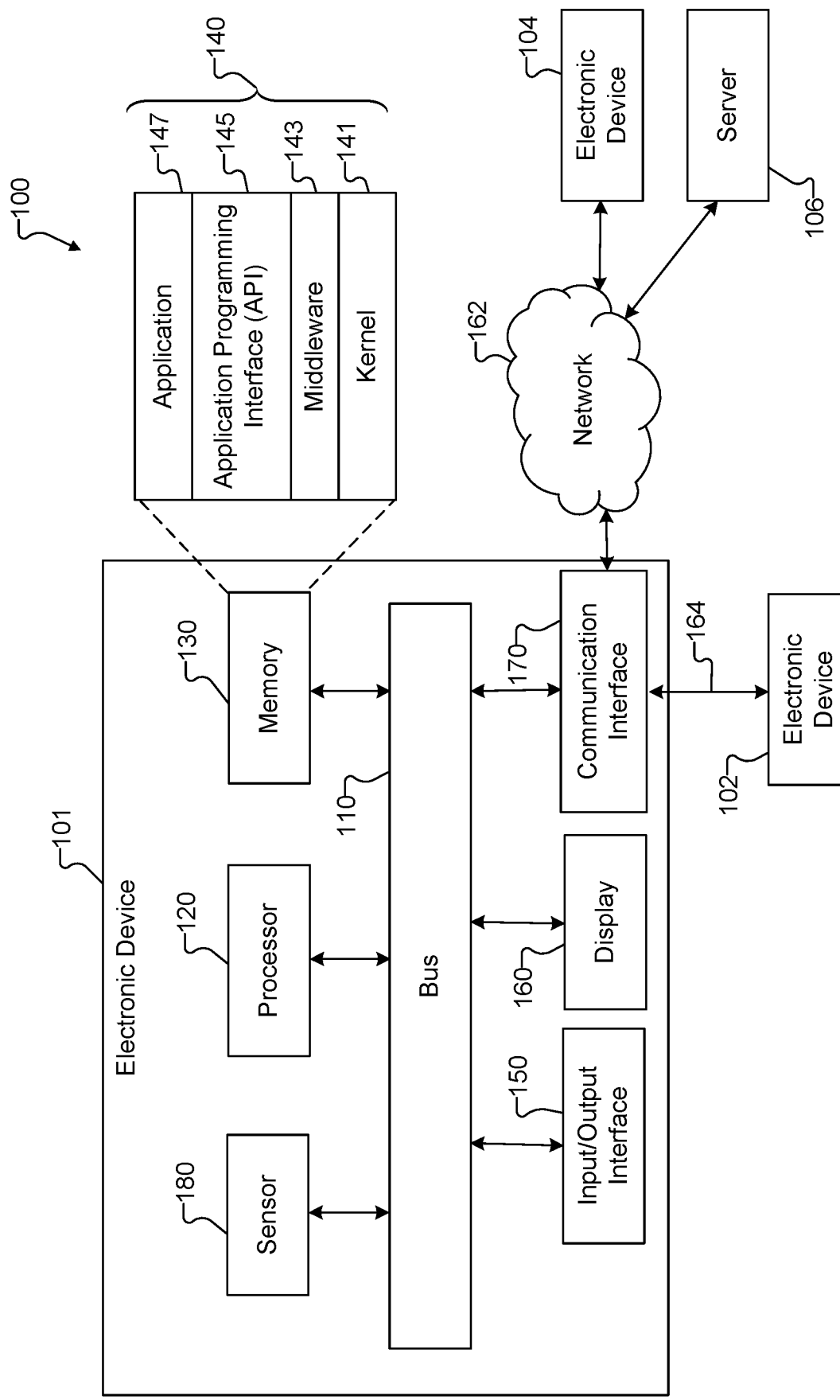
FIG. 1 illustrates an example network configuration including an electronic device in accordance with this disclosure.

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, audio-driven three-dimensional (3D) avatar animation typically involves the generation and display of a 3D avatar or character having a face that moves while audio information imitating a voice is played to a user. Ideally, the movements of the character's mouth and other facial features match the playback of the audio information, thereby supporting effective lip syncing between the audio information and the facial animations. Audio-driven 3D avatar animation using deep learning models has shown great promise for providing realistic 3D facial animations on mobile devices, such as smartphones, smart watches, and tablet computers. However, current approaches for audio-driven 3D avatar animation using deep learning models can suffer from a number of shortcomings.

As examples of these shortcomings, deep learning models on mobile electronic devices or other electronic devices are typically used to extract content and style information from input voice data, where the content and style information is used to generate content and style parameters for animating a 3D avatar. Deep learning-based approaches employ separate independent machine learning models for content and style extraction. As a result, these approaches can require training multiple independent machine learning models separately, which often requires large amounts of training data and time. Moreover, training multiple independent machine learning models separately can result in suboptimal performance once the independent machine learning models are placed into combined use together. In addition, the independent machine learning models can have a combined size that is quite large, which may interfere with or prevent usage of the machine learning models on resource-constrained devices (such as mobile electronic devices or other end-user electronic devices). Overall, these shortcomings can result in large, slow, and error-prone machine learning models being produced and placed into operation on limited types of devices.

This disclosure provides machine learning-based approaches for audio-driven avatar animation or other functions. As described in more detail below, a machine learning model can be trained to effectively identify content parameter predictions and style parameter predictions associated with audio data. For example, a shared feature extractor of a machine learning model can be trained to extract audio features from audio samples of at least one training dataset, where the audio samples are labeled with ground truth audio features, such as Mel-frequency cepstral coefficients (MFCCs). Other components of the machine learning model can be trained based on the extracted audio features. As a particular example, a content encoder, a content decoder, a style encoder, and a style decoder of the machine learning model can be trained to generate content parameter predictions and style parameter predictions that match or closely match ground truth content parameters and ground truth style parameters. The machine learning model can also be trained to disentangle content embeddings and style embeddings generated by the content and style encoders and decoded by the content and style decoders. This allows the content parameter predictions and the style parameter predictions to be generated effectively across a wide range of contents and styles. An audio decoder of the machine learning model may optionally generate reconstructed audio samples based on at least some of the content embeddings and at least some of the style embeddings, and the machine learning model can be trained to minimize differences between the audio samples and the reconstructed audio samples.

Once training is completed, the trained machine learning model (or a modified version thereof) may be deployed to one or more mobile electronic devices or other electronic devices and used during inferencing operations. In some embodiments, the deployed machine learning model can include the shared feature extractor, the content encoder, the content decoder, the style encoder, and the style decoder as trained, while the audio decoder may optionally be omitted from the deployed machine learning model. During inferencing, an audio input associated with a speaker is obtained, and the feature extractor extracts audio features from the audio input. The audio features are provided to the content encoder and the style encoder for use in generating content and style embeddings, and the content decoder and the style decoder generate one or more content parameter predictions and one or more style parameter predictions based on the content and style embeddings. The one or more content parameter predictions and the one or more style parameter predictions may be used to perform any suitable function or functions. For instance, the one or more content parameter predictions and the one or more style parameter predictions may be used to animate an avatar associated with the speaker, identify the speaker who provided the audio input, or perform any other suitable function(s).

In this way, a machine learning model may be trained to effectively identify both content parameter predictions and style parameter predictions associated with input audio data. Moreover, the use of a shared feature extractor to identify both the content parameter predictions and the style parameter predictions can help to reduce the overall size and increase the speed of the trained machine learning model. At least some embodiments of the trained machine learning model are suitable for use on a wide range of devices, including (but not limited to) mobile devices or other devices that are more resource-constrained. Further, the ability to train the machine learning model in such a manner so as to disentangle the content embeddings and the style embeddings allows the content and style encoders and decoders of the machine learning model to generate more accurate content and style parameter predictions, even across a wide range of possible contents and styles. In addition, the content and style encoders and decoders of the machine learning model may be trained using the same training data, which can help to reduce the amount of training data, time, and cost needed to conduct the training.

Note that the functionality described here may be used in any suitable applications, such as for real-time and personalized lip sync animation of 3D avatars or other characters, the "transfer" of a speaker's spoken content and speaking style to an avatar in a "metaverse" or other virtual reality space, or the identification of who is speaking to a virtual assistant. A combination of functions can also be performed, such as when an identification of who among multiple speakers is speaking at any given time is combined with avatar animation in order to produce multiple animated avatars associated with the multiple speakers. However, this functionality may be used in any other suitable manner. Also note that this type of functionality may be used with any suitable electronic devices, such as smartphones, smart watches, tablet computers, extended reality (XR)-based devices, or digital televisions. XR devices generally include (without limitation) virtual reality (VR) devices, augmented reality (AR) devices, and mixed reality (MR) devices. A VR device typically creates a computer-generated environment around a user, which generally involves completely replacing the user's view of his or her current environment with the computer-generated environment. An AR device typically enhances a user's view of his or her current environment by overlaying content (such as information or digital objects) over the user's view of the current environment. An MR device is often considered to be somewhat in between VR and AR devices, where the MR device generates a combination of real-world and digital content for viewing by a user. However, the functionality described here may be used with any other suitable devices. In addition, note that this type of functionality may involve the use of any suitable trained machine learning model or models, such as one or more deep neural networks (DNNs) or other deep learning models. However, this functionality may be used with any other suitable machine learning model architectures.

The following terms are used in this patent document and can be defined as follows. A "phoneme" generally refers to a distinct speech sound, while a "viseme" generally refers to phonemes or speech sounds that look similar visually when spoken. Thus, visemes identified as being related to phonemes that are contained in speech may be used to produce visual animations for that speech. Also, "speech" and "content" both generally refer to what a speaker says, while "style" generally refers to how the speaker says that content. Examples of speech or content include phonemes, visemes, sub-words, and words. Examples of style include emotions, facial expressions, and speaker attributes such as speaker identities, genders, accents, pitches, volume intensities, and speeds.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 can receive and process audio data using a trained machine learning model to generate content parameter predictions and style parameter predictions based on the audio data. The content parameter predictions and the style parameter predictions may be used to perform lip sync animation (such as for a 3D avatar or other displayed character), identify a speaker, transfer characteristics of a speaker to a 3D avatar, or perform other functions. Also or alternatively, the processor 120 can receive training data and perform a training process in order to train the machine learning model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for processing audio data using a trained machine learning model to generate content parameter predictions and style parameter predictions and/or for performing a training process to train the machine learning model as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 may include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an XR wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some cases, the server 106 can receive and process audio data using a trained machine learning model to generate content parameter predictions and style parameter predictions based on the audio data. The content parameter predictions and the style parameter predictions may be used to perform lip sync animation (such as for a 3D avatar or other displayed character), identify a speaker, transfer characteristics of a speaker to a 3D avatar, or perform other functions. Also or alternatively, the server 106 can receive training data and perform a training process in order to train the machine learning model.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
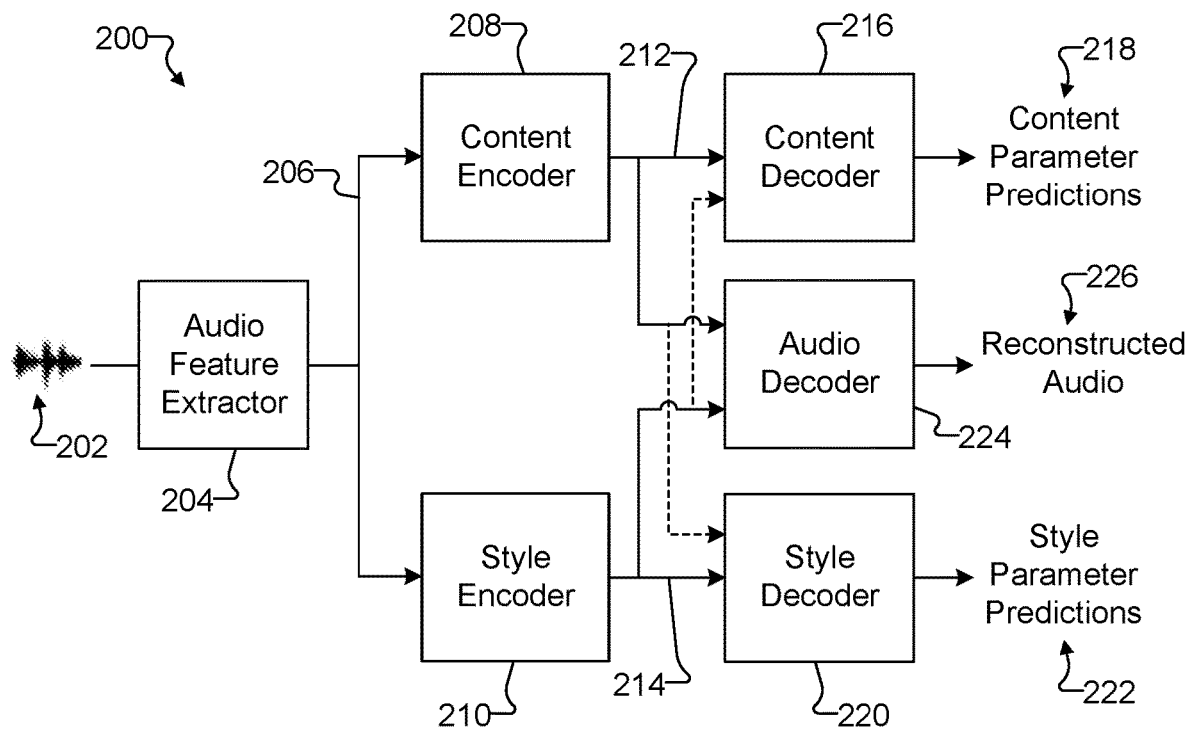
FIG. 2 illustrates an example architecture supporting a machine learning-based approach for audio-driven avatar animation or other functions according to this disclosure.

FIG. 2 illustrates an example architecture 200 supporting a machine learning-based approach for audio-driven avatar animation or other functions according to this disclosure. For ease of explanation, the architecture 200 shown in FIG. 2 is described as being implemented on or supported by the electronic device 101 and/or the server 106 in the network configuration 100 of FIG. 1. However, the architecture 200 shown in FIG. 2 could be used with any other suitable device(s) and in any other suitable system(s).

As shown in FIG. 2, the architecture 200 generally operates to receive and process audio input data 202. The audio input data 202 represents data capturing speech of at least one user or other speaker. For example, during training, the audio input data 202 may include labeled audio samples, where the labeled audio samples contain speech from various speakers and are associated with labels or annotations. During inferencing, the audio input data 202 may include audio data captured using at least one microphone of an electronic device 101. The audio input data 202 can be processed using a trained machine learning model (as defined by the architecture 200) in order to generate facial animations or other visual animations of an avatar, identify a speaker, or perform other functions. The audio input data 202 may represent any suitable audio information in any suitable format, such as raw segments of speech or normalized segments of speech. Note that, depending on the implementation, the audio input data 202 may contain audio information in a single language or in multiple languages (since there may be some cases where audio input data 202 is obtained for speakers using different languages).

The audio input data 202 is provided to an audio feature extractor 204 of the machine learning model, which generally operates to generate audio features 206 that are based on or otherwise extracted from the audio input data 202. The audio features 206 represent features or low-level audio characteristics of the audio input data 202 that are or may be relevant to the generation of content parameter predictions and style parameter predictions. For example, the audio features 206 may include local acoustic features and correlation features of the audio input data 202. As a particular example, the audio feature extractor 204 may be used to extract MFCCs using the audio input data 202. In this example, the audio feature extractor 204 represents a shared feature extractor in that the audio features 206 generated by the audio feature extractor 204 are used to generate both content parameter predictions and style parameter predictions. This means that common weights or other parameters are used by the audio feature extractor 204 to generate the audio features 206, which are used for both the content parameter predictions and the style parameter predictions. As a result, a single audio feature extractor 204 (rather than multiple independent audio feature extractors) may be used here, which can decrease the overall size of the architecture 200 and speed up the operation of the architecture 200.

The audio features 206 are provided to a content encoder 208 and a style encoder 210 of the machine learning model. The content encoder 208 generally operates to process the audio features 206 and encode the audio features 206 into content embeddings 212. The content embeddings 212 broadly define how content-related information captured within the audio features 206 are represented in a relatively lower-dimensional space (where the audio features 206 are typically expressed in a relatively higher-dimensional space). Similarly, the style encoder 210 generally operates to process the audio features 206 and encode the audio features 206 into style embeddings 214. The style embeddings 214 broadly define how style-related information captured within the audio features 206 are represented in a relatively lower-dimensional space (again where the audio features 206 are typically expressed in a relatively higher-dimensional space).

During some parts of the training process for the architecture 200, the content embeddings 212 are provided to a content decoder 216 of the machine learning model, which generally operates to decode the content embeddings 212 and generate content parameter predictions 218. For example, the content decoder 216 can use the content embeddings 212 (which represent content-related information captured within the audio features 206) in order to estimate what speech or content is contained in the audio input data 202. Similarly, the style embeddings 214 are provided to a style decoder 220 of the machine learning model, which generally operates to decode the style embeddings 214 and generate style parameter predictions 222. For instance, the style decoder 220 can use the style embeddings 214 (which represent style-related information captured within the audio features 206) in order to estimate what style characteristics are contained in the audio input data 202. During these parts of the training process for the architecture 200, the generated content parameter predictions 218 and the generated style parameter predictions 222 can be compared to "ground truths" (such as labels or annotations identifying correct predictions), and the architecture 200 can be adjusted while attempting to minimize the differences or loss between the predictions 218, 222 and the corresponding ground truths.

During other parts of the training process for the architecture 200, the content embeddings 212 are provided to the style decoder 220, which generally operates to decode the content embeddings 212 and generate style parameter predictions 222 (which are typically incorrect). Similarly, the style embeddings 214 are provided to the content decoder 216, which generally operates to decode the style embeddings 214 and generate content parameter predictions 218 (which are typically incorrect). As described below, this approach can be used to help train the architecture 200 to disentangle the content embeddings 212 and the style embeddings 214 so that the content encoder and decoder 208, 216 and the style encoder and decoder 210, 220 can be trained collectively and can use a common set of audio features 206 to distinguish a wide range of contents and styles. During these parts of the training process for the architecture 200, the generated content parameter predictions 218 and the generated style parameter predictions 222 can be compared to the ground truths, and the architecture 200 can be adjusted while attempting to maximize the differences or loss between the predictions 218, 222 and the corresponding ground truths.

The architecture 200 here optionally includes an audio decoder 224, which generally operates to process at least some of the content embeddings 212 and at least some of the style embeddings 214 to generate reconstructed audio data 226. The reconstructed audio data 226 represents an estimate of what the audio samples or other audio contents of the audio input data 202 would be based only on the content embeddings 212 and the style embeddings 214 generated by the architecture 200. During training of the architecture 200, the reconstructed audio data 226 can be compared to the audio input data 202, and the architecture 200 can be adjusted while attempting to minimize the differences or loss between the reconstructed audio data 226 and the audio input data 202. Among other things, this type of approach can help to support unsupervised learning by the architecture 200.

Once the architecture 200 is adequately trained, at least part of the architecture 200 can be deployed to one or more mobile electronic devices or other electronic devices and used during inferencing operations. For example, in some embodiments, the architecture 200 without the audio decoder 224 may be deployed to one or more electronic devices and used during inferencing. During the inferencing operations, the audio input data 202 may represent any suitable audio data, such as audio data captured of a user of the electronic device 101 or other speaker. The architecture 200 can process the audio input data 202, generate one or more content parameter predictions 218 and one or more style parameter predictions 222, and use the content parameter prediction(s) 218 and the style parameter prediction(s) 222 in some manner (such as for avatar animation, speaker identification, etc.).

The content parameter predictions 218 generated by the architecture 200 relate to the content or speech contained in the audio input data 202. For example, the content parameter predictions 218 may include predictions regarding what phonemes, visemes, sub-words, and/or words are contained in the audio input data 202. The style parameter predictions 222 generated by the architecture 200 relate to the speaker's style used to deliver the content or speech contained in the audio input data 202. For instance, the style parameter predictions 222 may include predictions regarding what emotions, facial expressions, and speaker attributes (such as speaker identities, genders, accents, pitches, volume intensities, and/or speeds) were associated with the speaker(s).

As can be seen in this example, the architecture 200 generally unifies the identification of the content parameter predictions 218 and the style parameter predictions 222 into a single framework. Weight sharing is supported through the use of the common audio feature extractor 204. Also, disentangled representation learning can be supported during training in order to facilitate disentanglement of the content embeddings 212 and the style embeddings 214. The disentangled representation learning is described in more detail below and can involve alternating between two different modes during the training process. The audio decoder 224 here can be used to support unsupervised training of the content and style pathways in the architecture 200 during the training process.

Among other benefits, the content and style pathways in the architecture 200 share the common audio feature extractor 204, and the content and style pathways in the architecture 200 include their own encoders and decoders for generating and processing disentangled content and style embeddings 212, 214. The content and style pathways may optionally be trained using different loss functions, which can help the content and style pathways to be effectively trained to perform their respective functions. Moreover, weight sharing reduces the overall model size, and the use of disentangled representations enables better generalization to different styles and contents. Further, by reducing the model size and combining supervised and unsupervised training techniques, the design of the architecture 200 reduces the total amount of data needed for training the model without sacrificing performance. Overall, this allows the architecture 200 to be lightweight, require less training data, achieve better generalization, and achieve more accurate 3D avatar animations or other results.

It should be noted that the functions shown in or described with respect to FIG. 2 can be implemented in an electronic device 101, 102, 104, server 106, or other device in any suitable manner. For example, in some embodiments, at least some of the functions shown in or described with respect to FIG. 2 can be implemented or supported using one or more software applications or other software instructions that are executed by the processor 120 of the electronic device 101, 102, 104, server 106, or other device. In other embodiments, at least some of the functions shown in or described with respect to FIG. 2 can be implemented or supported using dedicated hardware components. In general, the functions shown in or described with respect to FIG. 2 can be performed using any suitable hardware or any suitable combination of hardware and software/firmware instructions.

Although FIG. 2 illustrates one example of an architecture 200 supporting a machine learning-based approach for audio-driven avatar animation or other functions, various changes may be made to FIG. 2. For example, various components and functions shown in FIG. 2 may be combined, further subdivided, replicated, omitted, or rearranged and additional components or functions may be added according to particular needs.

Figure 3:
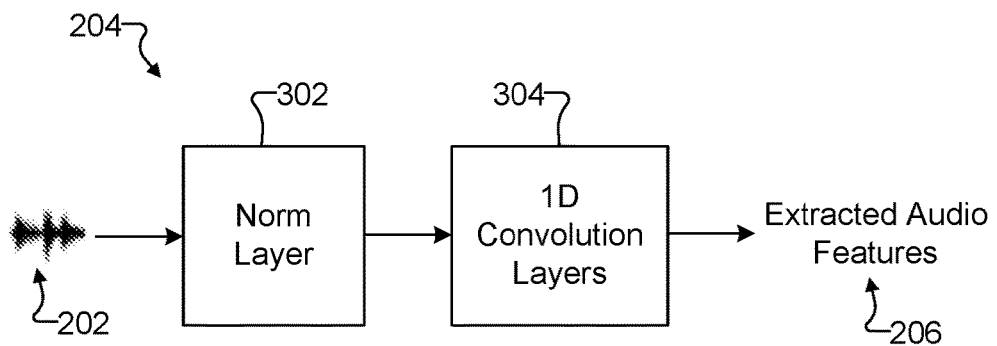
FIG. 3 illustrates an example audio feature extractor that may be used in the architecture of FIG. 2 according to this disclosure.

FIG. 3 illustrates an example audio feature extractor 204 that may be used in the architecture 200 of FIG. 2 according to this disclosure. As shown in FIG. 3, the audio feature extractor 204 generally operates to process the audio input data 202 and generate extracted audio features 206 based on the audio input data 202. In this example embodiment, the audio feature extractor 204 is implemented using a normalization layer 302 and one or more one-dimensional (1D) convolution layers 304. The normalization layer 302 generally operates to prepare the audio input data 202 for processing by the 1D convolution layer(s) 304. For example, the normalization layer 302 may convert a time-series sequence of data related to frequency content of audio data (as contained in or represented by the audio input data 202) into vectors or other suitable inputs for the 1D convolution layer(s) 304. Among other things, this can help to generalize the architecture 200 for use with different kinds of audio waveforms.

The one or more 1D convolution layers 304 represent or implement one or more convolutions that operate on the data contained in or represented by the audio input data 202 (as provided by the normalization layer 302) in order to extract the audio features 206 related to the audio input data 202. In some cases, for instance, the 1D convolution layers 304 may perform convolution operations along time and frequency domains so that different 1D convolution layers 304 identify different audio features of the audio input data 202. Each of the 1D convolution layers 304 may also include or be associated with an activation layer, such as a rectified linear unit (ReLU) activation layer.

The audio feature extractor 204 may include any suitable number of 1D convolution layers 304 that are trained or otherwise designed to generate audio features 206. In some embodiments, for example, the audio feature extractor 204 may include five 1D convolution layers 304 arranged to operate sequentially. The audio feature extractor 204 may also be trained or otherwise designed in any suitable manner. In some cases, for instance, weights or other parameters of the audio feature extractor 204 may be fixed, such as when smaller amounts of training data are available. In other cases, weights or other parameters of the audio feature extractor 204 may be initially set and then finetuned during training, such as when larger amounts of training data are available.

Overall, the audio feature extractor 204 here operates to extract low-level audio features 206 automatically from the audio input data 202 for downstream content- and style-related tasks. Sharing the audio feature extractor 204 for use with the content- and style-related tasks (rather than providing independent feature extractors for the content- and style-related tasks) helps to reduce the overall model size and reduce the amount of labeled training data that is needed. Since the collection of labeled training data can be time-consuming and expensive, this can help to simplify the overall training process and reduce its length and cost. In addition, sharing the audio feature extractor 204 for use with the content- and style-related tasks can reduce overall inferencing times, which can help to speed up inferencing operations and enable usage of the architecture 200 on a wide variety of devices (including more resource-constrained devices like some types of mobile devices).

Although FIG. 3 illustrates one example of an audio feature extractor 204 that may be used in the architecture 200 of FIG. 2, various changes may be made to FIG. 3. For example, the audio feature extractor 204 may be implemented in any other suitable manner.

Figure 4:
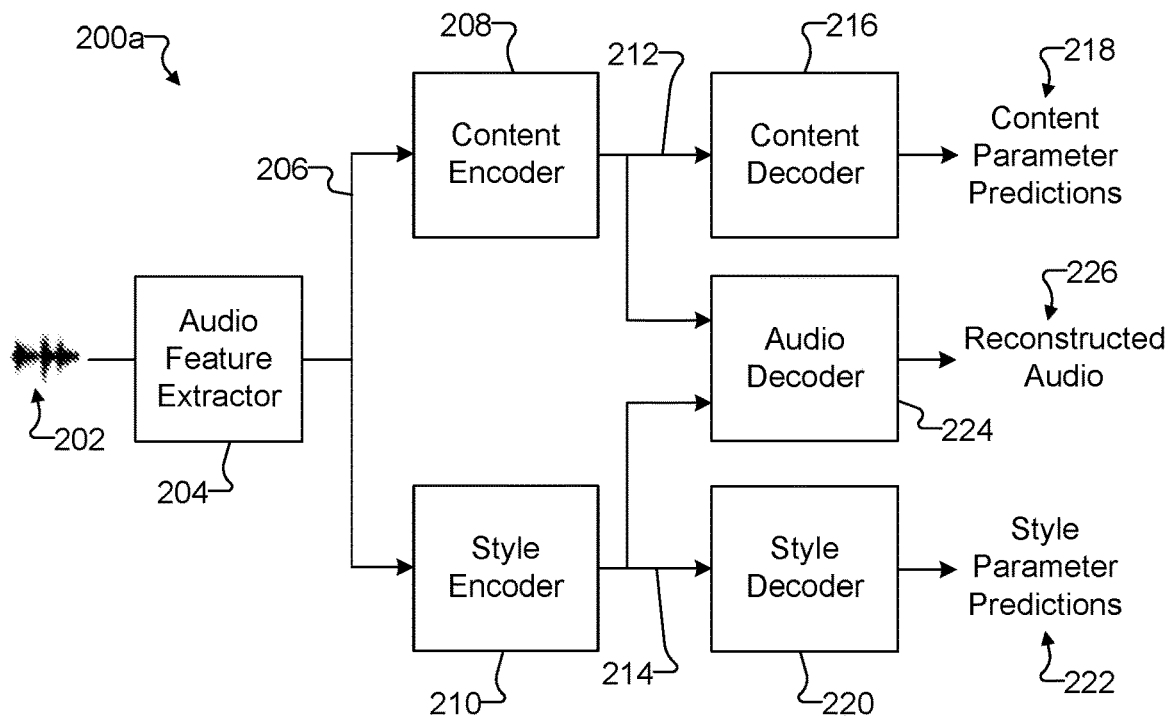
FIGS. 4 and 5 illustrate example training configurations involving the architecture of FIG. 2 according to this disclosure.
Figure 5:
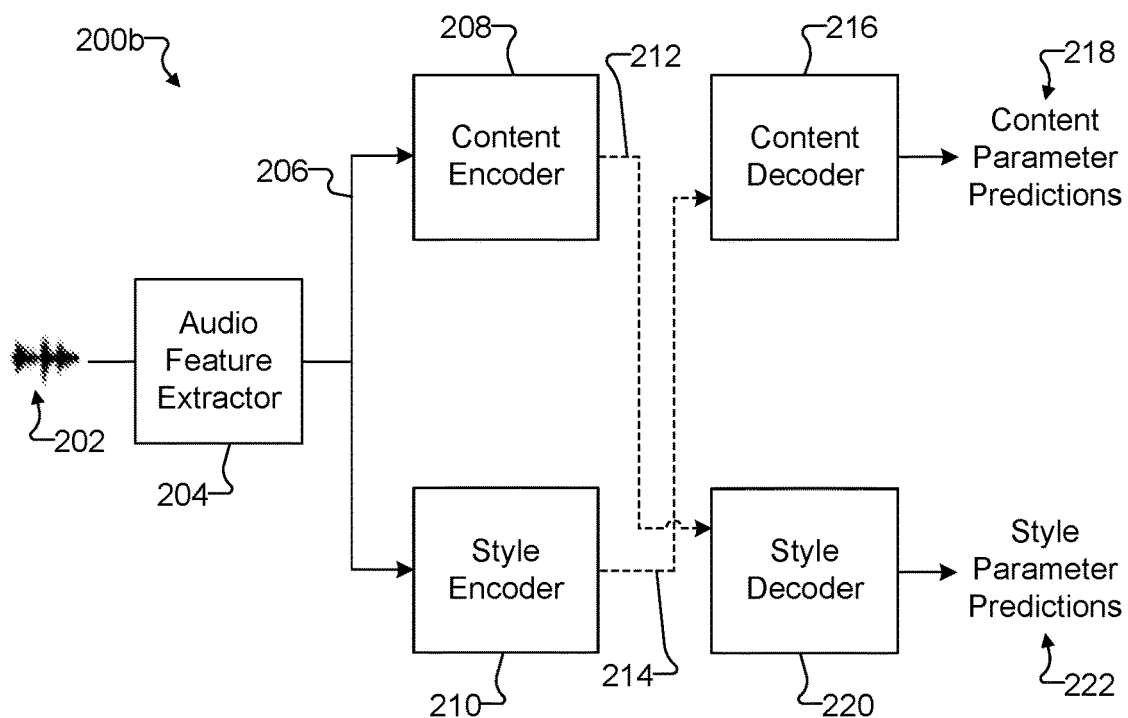
Figure 6:
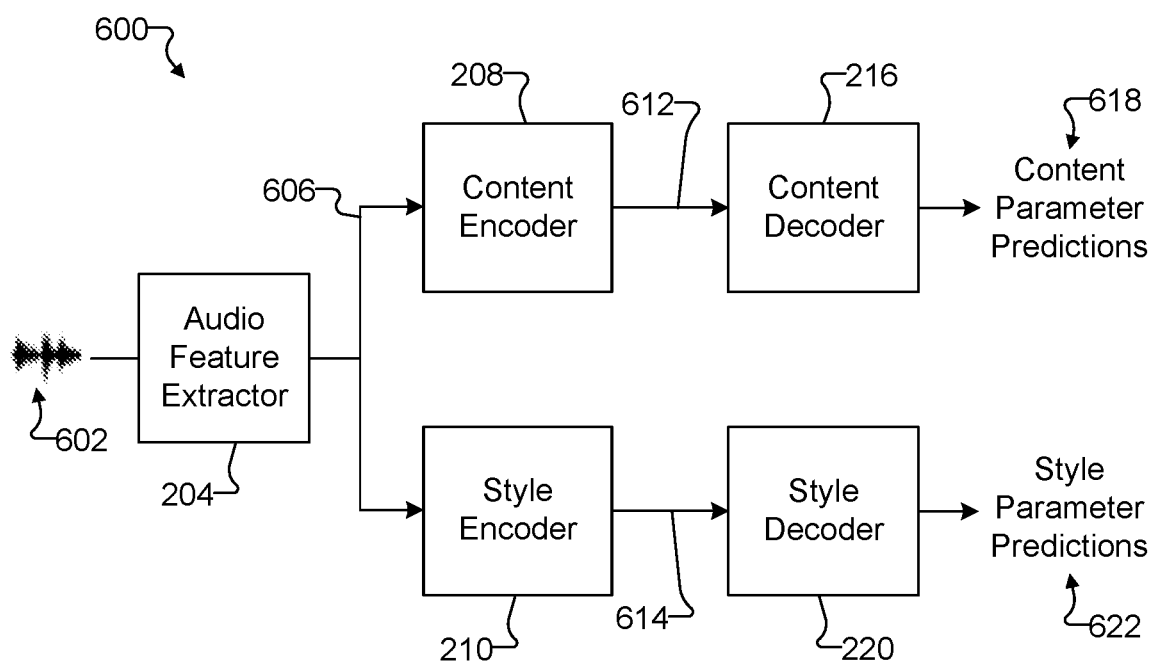
FIG. 6 illustrates an example deployment configuration involving the architecture of FIG. 2 according to this disclosure.

FIGS. 4 and 5 illustrate example training configurations 200a and 200b involving the architecture 200 of FIG. 2 according to this disclosure, and FIG. 6 illustrates an example deployment configuration 600 involving the architecture 200 of FIG. 2 according to this disclosure. As noted above, the architecture 200 may be trained to learn how to generate the content parameter predictions 218 and the style parameter predictions 222, and this can be done in two modes that are generally referred to as "normal" and "disentangled" modes (which is done merely for convenience). The normal mode is shown in FIG. 4, where the architecture 200 takes on the training configuration 200a and may be trained using a normal loss function. The disentangled mode is shown in FIG. 5, where the architecture 200 takes on the training configuration 200b and may be trained using a disentangled loss function. Once the architecture 200 is adequately trained, the architecture 200 or a modified version thereof can be deployed, and FIG. 6 illustrates one example of the deployment configuration 600 of the architecture 200.

As shown in FIG. 4, during one mode of training the architecture 200, the content embeddings 212 are provided to the content decoder 216 and optionally to the audio decoder 224, and the style embeddings 214 are provided to the style decoder 220 and optionally to the audio decoder 224. In this training mode, the content decoder 216 uses the content embeddings 212 to generate the content parameter predictions 218, and the style decoder 220 uses the style embeddings 214 to generate the style parameter predictions 222. The content parameter predictions 218 are compared to ground truth content parameters, which represent expected content parameters that should have been generated using the architecture 200. Similarly, the style parameter predictions 222 are compared to ground truth style parameters, which represent expected style parameters that should have been generated using the architecture 200. Differences between the ground truth content parameters and the content parameter predictions 218 and differences between the ground truth style parameters and the style parameter predictions 222 are used to calculate loss values. In some cases, each loss value can be expressed as follows.

$$L_{normal}(Y_{pred}, Y_{groundtruth})$$

This part of the training process can be used to adjust weights or other parameters of at least the content and style encoders 208, 210 and the content and style decoders 216, 220 based on the predicted loss values in order to alter how the architecture 200 generates the content parameter predictions 218 and the style parameter predictions 222. Ideally, repeatedly adjusting the weights or other parameters of the components of the architecture 200 over time will train the content encoder 208 and content decoder 216 to generate correct predictions of content and will train the style encoder 210 and style decoder 220 to generate correct predictions of style (at least to within some specified degree of accuracy). One goal of this part of the training process can be to minimize the loss values calculated here, which would help to minimize the differences between the ground truth content parameters and the content parameter predictions 218 and minimize the differences between the ground truth style parameters and the style parameter predictions 222. Effectively, this training forces the content embeddings 212 to contain adequate content information for making correct content predictions and forces the style embeddings 214 to contain adequate style information for making correct style predictions.

During this mode of training, the audio decoder 224 can generate the reconstructed audio data 226 using at least some of the content embeddings 212 and at least some of the style embeddings 214. The reconstructed audio data 226 can be compared to the audio input data 202, and differences between the reconstructed audio data 226 and the audio input data 202 can be used to calculate other loss values. When a loss value exceeds a threshold, weights or other parameters of at least the content and style encoders 208, 210 and the content and style decoders 216, 220 can be adjusted. Ideally, the loss values decrease over time, and the differences between the audio input data 202 and the reconstructed audio data 226 can be minimized. As noted above, this approach can support unsupervised training of the content and style pathways in the architecture 200.

As shown in FIG. 5, during another mode of training the architecture 200, the content embeddings 212 are provided to the style decoder 220, and the style embeddings 214 are provided to the content decoder 216. In this training mode, the content decoder 216 uses the style embeddings 214 to generate the content parameter predictions 218, which will be incorrect very often due to the fact that style information is being used for content predictions. Similarly, the style decoder 220 uses the content embeddings 212 to generate the style parameter predictions 222, which will be incorrect very often due to the fact that content information is being used for style predictions. Differences between the ground truth content parameters and the content parameter predictions 218 and differences between the ground truth style parameters and the style parameter predictions 222 are used to calculate other loss values. In some cases, each loss value can be expressed as follows.

$$L_{disentangle}(Y_{pred}, Y_{groundtruth}) = -L_{normal}(Y_{pred}, Y_{groundtruth})$$

This part of the training process can be used to adjust weights or other parameters of at least the content and style encoders 208, 210 and the content and style decoders 216, 220 based on the predicted loss values in order to alter how the architecture 200 generates the content parameter predictions 218 and the style parameter predictions 222. In this mode of training, the content and style pathways of the architecture 200 are being trained adversarially to generate disentangled representations of the content and style of the audio input data 202. This is accomplished by forcing the architecture 200 to generate incorrect style parameter predictions 222 based on the content embeddings 212 and by forcing the architecture 200 to generate incorrect content parameter predictions 218 based on the style embeddings 214. Here, training can be performed with a disentangled loss function, which in the example above represents a negative of the normal loss function. One goal of this part of the training process can be to maximize the loss values calculated here, which would help to maximize the differences between the ground truth content parameters and the (incorrect) content parameter predictions 218 and maximize the differences between the ground truth style parameters and the (incorrect) style parameter predictions 222.

Note that the audio input data 202 used during the different modes of the training process may represent the same audio data or different audio data. That is, during normal training of the architecture 200 as shown in FIG. 4, the audio input data 202 can represent a first collection of training data, which is used to generate a first collection of audio features 206. During disentangled training of the architecture 200 as shown in FIG. 5, the audio input data 202 can represent a second collection of training data, which is used to generate a second collection of audio features 206. The second collection of training data may represent the same audio data as the first collection of training data, or the second collection of training data may represent different audio data from the first collection of training data. As a result, the second collection of audio features 206 may represent the same audio features as the first collection of audio features 206, or the second collection of audio features 206 may represent different audio features from the first collection of audio features 206. Also note that the normal and disentangled modes of training can be repeated any number of times. In some embodiments, for instance, the normal and disentangled modes of training can occur iteratively and in an alternating manner (such as normal mode, disentangled mode, normal mode, disentangled mode, etc.) until the calculated loss values are adequately low or high (depending on the training mode) or until some other criterion or criteria are satisfied.

While it may appear above that the same loss function is used in each training mode for both the content and style predictions, this need not be the case. In other embodiments, for example, the loss value associated with the content parameter predictions 218 may be calculated in the same manner or in a different manner than the loss value associated with the style parameter predictions 222. Moreover, this may occur in one or both training modes.

In addition, one or more data augmentation approaches may or may not be used to generate or supplement the training data that is available for use when training the architecture 200. For instance, at least one training dataset may be obtained and used to train the architecture 200. In order to more fully train the architecture 200, it is possible to modify the audio input data 202 contained in the training dataset(s) in order to produce additional audio input data 202, which can be used (along with the original training dataset(s)) to train the architecture 200. As particular examples, the audio input data 202 contained in the original training dataset(s) may be modified to include different volumes, pitches, or speeds and/or may be subjected to spectral augmentation in order to produce additional audio input data 202. The labels or annotations from the original audio input data 202 can be copied over to the additional audio input data 202, which can result in a much larger dataset or datasets being available for training purposes.

Once the architecture 200 is adequately trained, the architecture 200 (or a modified version thereof) can be deployed. As shown in FIG. 6, one example of a deployment configuration 600 of the architecture 200 can be deployed, where the deployment configuration 600 lacks the audio decoder 224. The deployment configuration 600 of the architecture 200 can receive audio input data 602 (such as from one or more microphones of an electronic device 101) and generate audio features 606 based on the audio input data 602. The deployment configuration 600 of the architecture 200 can also process the audio features 606 to produce content embeddings 612 and style embeddings 614, and the embeddings 612, 614 can be respectively decoded to produce one or more content parameter predictions 618 and one or more style parameter predictions 622. Note that the pathways for sending the content embeddings 612 to the style decoder 220 and for sending the style embeddings 614 to the content decoder 216 can be omitted here, since those pathways were used for disentangled training of the architecture 200 and are not needed during actual inferencing operations.

The overall approach shown here allows the architecture 200 or its deployment configuration 600 to obtain a lightweight form and achieve shortened inferencing times. Moreover, this can be achieved while maintaining or even improving the accuracy of the architecture 200 or its deployment configuration 600. As a particular example, it can be shown that the deployment configuration 600 of the architecture 200 may achieve modest improvements in accuracy by undergoing the disentangled training while achieving significant size reductions (such as up to 25% reductions or even more) and while achieving significant inferencing time reductions (such as up to 50% reductions or even more) compared to a prior approach using a standard dataset. Note, however, that these values can vary based on the prior approach used as the baseline and based on the dataset being processed.

Although FIGS. 4 through 6 illustrate examples of training configurations 200a-200b and a deployment configuration 600 involving the architecture 200 of FIG. 2, various changes may be made to FIGS. 4 through 6. For example, various components and functions shown in FIGS. 4 through 6 may be combined, further subdivided, replicated, omitted, or rearranged and additional components or functions may be added according to particular needs.

Figure 7A:
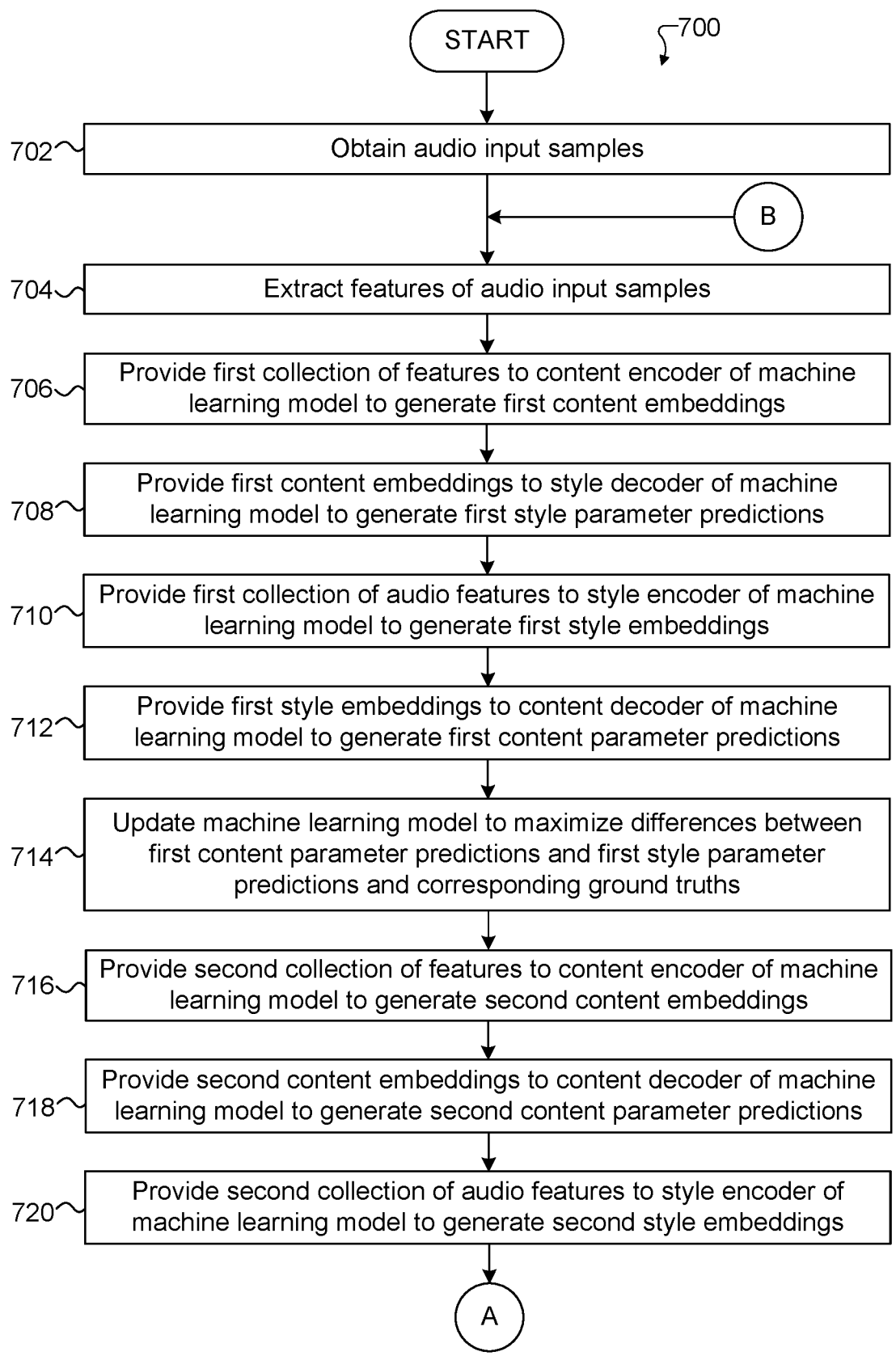
FIGS. 7A and 7B illustrate an example method for training a machine learning-based approach for audio-driven avatar animation or other functions according to this disclosure.
Figure 7B:
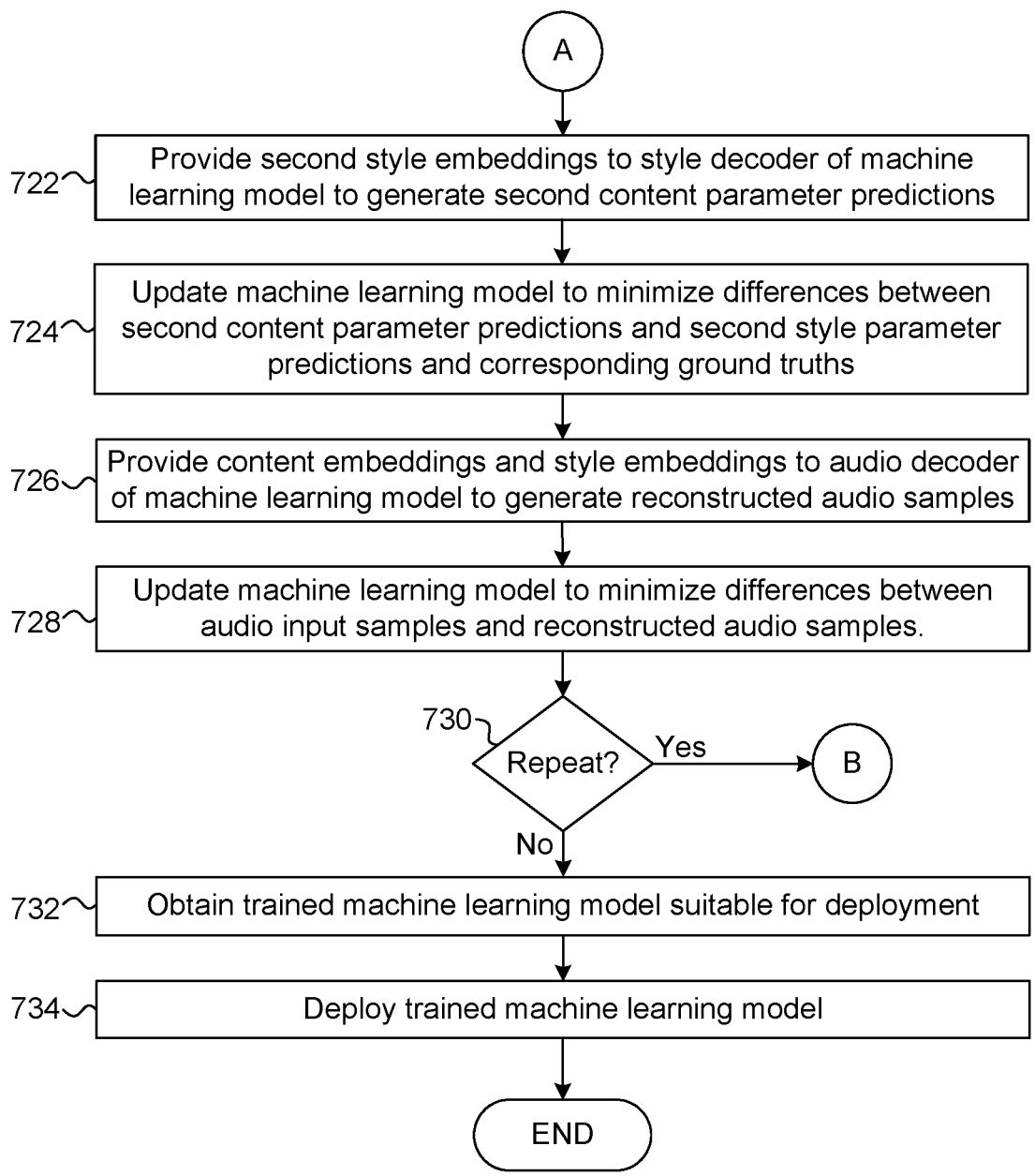

FIGS. 7A and 7B illustrate an example method 700 for training a machine learning-based approach for audio-driven avatar animation or other functions according to this disclosure. For ease of explanation, the method 700 shown in FIGS. 7A and 7B is described as being performed using the server 106 in the network configuration 100 of FIG. 1. However, the method 700 shown in FIGS. 7A and 7B could be performed using any other suitable device(s), such as the electronic device 101, and in any other suitable system(s).

As shown in FIGS. 7A and 7B, audio input samples are obtained at step 702. This may include, for example, the processor 120 of the server 106 obtaining audio input data 202 associated with one or more training datasets. An iterative training process occurs using the audio input samples. As part of the iterative training process, features of the audio input samples are extracted at step 704. This may include, for example, the processor 120 of the server 106 using the audio feature extractor 204 to extract audio features 206 based on the audio input data 202.

Also, as part of the iterative training process, a first collection of the audio features is provided to a content encoder of a machine learning model to generate first content embeddings at step 706. This may include, for example, the processor 120 of the server 106 providing at least some of the audio features 206 to the content encoder 208 for use in generating first content embeddings 212. The first content embeddings are provided to a style decoder of the machine learning model to generate first style parameter predictions at step 708. This may include, for example, the processor 120 of the server 106 providing at least some of the content embeddings 212 to the style decoder 220 for use in generating first style parameter predictions 222 (which as noted above are likely incorrect). The first collection of audio features is also provided to a style encoder of the machine learning model to generate first style embeddings at step 710. This may include, for example, the processor 120 of the server 106 providing at least some of the audio features 206 to the style encoder 210 for use in generating first style embeddings 214. The first style embeddings are provided to a content decoder of the machine learning model to generate first content parameter predictions at step 712. This may include, for example, the processor 120 of the server 106 providing at least some of the style embeddings 214 to the content decoder 216 for use in generating first content parameter predictions 218 (which as noted above are likely incorrect). The machine learning model is updated to maximize the differences between the first content parameter predictions and the first style parameter predictions and their corresponding ground truths at step 714. This may include, for example, the processor 120 of the server 106 adjusting one or more weights or other parameters of one or more of the content and style encoders 208, 210 and/or the content and style decoders 216, 220.

Moreover, as part of the iterative training process, a second collection of the audio features is provided to the content encoder of the machine learning model to generate second content embeddings at step 716. This may include, for example, the processor 120 of the server 106 providing at least some of the audio features 206 to the content encoder 208 for use in generating second content embeddings 212. The audio features used here may or may not represent the same audio features used with steps 706-714. The second content embeddings are provided to the content decoder of the machine learning model to generate second content parameter predictions at step 718. This may include, for example, the processor 120 of the server 106 providing at least some of the content embeddings 212 to the content decoder 216 for use in generating second content parameter predictions 218. The second collection of audio features is provided to the style encoder of the machine learning model to generate second style embeddings at step 720. This may include, for example, the processor 120 of the server 106 providing at least some of the audio features 206 to the style encoder 210 for use in generating second style embeddings 214. The second style embeddings are provided to the style decoder of the machine learning model to generate second style parameter predictions at step 722. This may include, for example, the processor 120 of the server 106 providing at least some of the style embeddings 214 to the style decoder 220 for use in generating second style parameter predictions 222. The machine learning model is updated to minimize the differences between the second content parameter predictions and the second style parameter predictions and their corresponding ground truths at step 724. This may include, for example, the processor 120 of the server 106 adjusting one or more weights or other parameters of one or more of the content and style encoders 208, 210 and/or the content and style decoders 216, 220.

In addition, as part of the iterative training process, at least some of the content embeddings and at least some of the style embeddings may be provided to an audio decoder for use in generating reconstructed audio samples at step 726. This may include, for example, the processor 120 of the server 106 providing at least some of the first or second content embeddings 212 and at least some of the first or second style embeddings 214 to the audio decoder 224 for use in generating reconstructed audio data 226. The machine learning model is updated to minimize the differences between the audio input data and the reconstructed audio data at step 728. This may include, for example, the processor 120 of the server 106 adjusting one or more weights or other parameters of one or more of the content and style encoders 208, 210 and/or the content and style decoders 216, 220.

A determination is made whether to perform another iteration of the training process at step 730. This may include, for example, the processor 120 of the server 106 determining whether the loss values associated with the normal training mode and the audio reconstruction are suitably low (such as less than a corresponding threshold) and whether the loss values associated with the disentangled training mode are suitably high (such as above an associated threshold). One or more other criteria may also be considered here, such as whether a specified number of training iterations have already been performed or whether a specified period of time has already elapsed. If the decision is made to perform another iteration of the training process, the process returns to step 704. Otherwise, the training process is completed, and a trained machine learning model suitable for deployment is generated or otherwise obtained at step 732. This may include, for example, the processor 120 of the server 106 using the trained architecture 200 produced by the training process as the trained machine learning model or generating a deployment configuration 600 for the trained architecture 200. The trained machine learning model is deployed at step 734. This may include, for example, the processor 120 of the server 106 providing the deployment configuration 600 or the trained architecture 200 to one or more mobile electronic devices or other electronic devices.

Although FIGS. 7A and 7B illustrate one example of a method 700 for training a machine learning-based approach for audio-driven avatar animation or other functions, various changes may be made to FIGS. 7A and 7B. For example, while shown as a series of steps, various steps in FIGS. 7A and 7B may overlap, occur in parallel, occur in a different order, or occur any number of times (including zero times).

Figure 8:
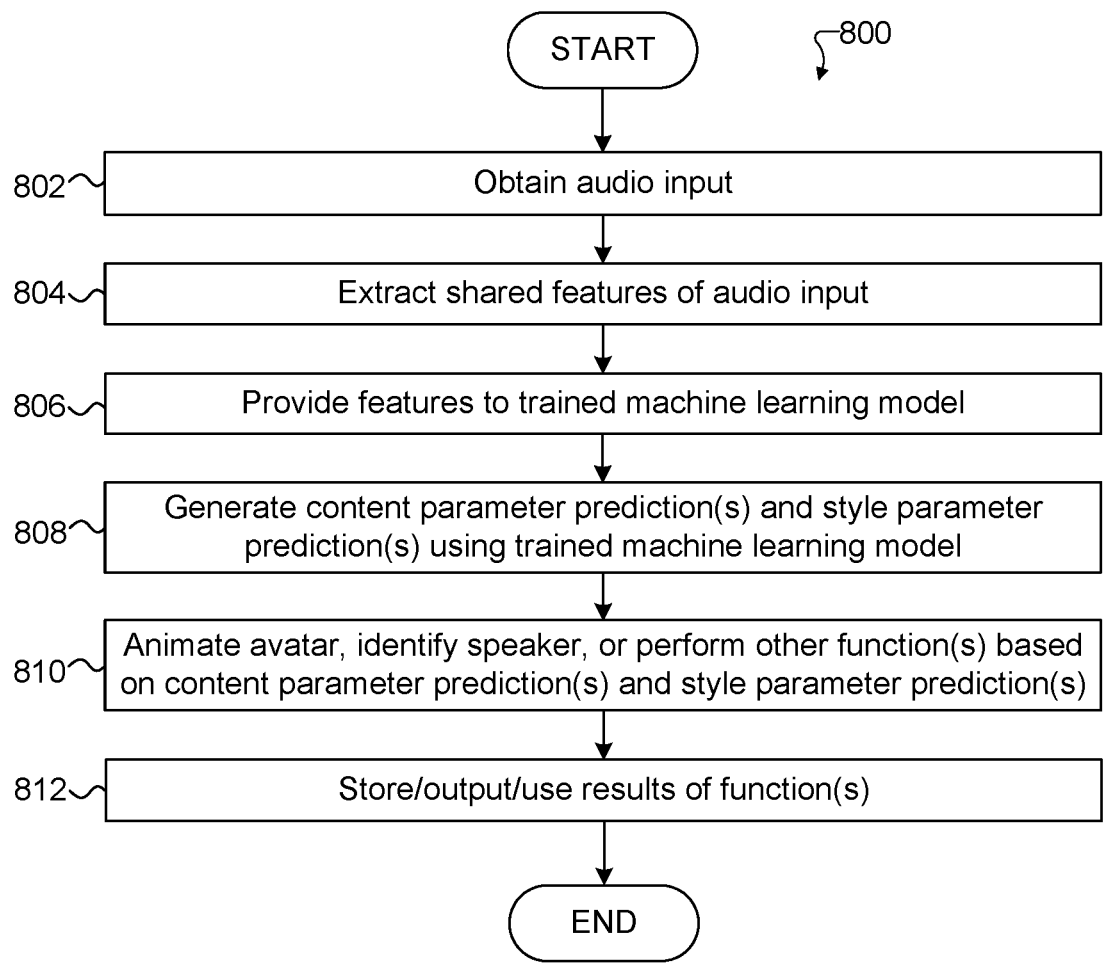
FIG. 8 illustrates an example method for using a trained machine learning-based approach for audio-driven avatar animation or other functions according to this disclosure.

FIG. 8 illustrates an example method 800 for using a trained machine learning-based approach for audio-driven avatar animation or other functions according to this disclosure. For ease of explanation, the method 800 shown in FIG. 8 is described as being performed using the electronic device 101 in the network configuration 100 of FIG. 1. As a particular example, the method 800 may be performed after the method 700 has been used to generate a trained machine learning model or a deployment configuration based on a trained machine learning model. However, the method 800 shown in FIG. 8 could be performed using any other suitable device(s), such as the server 106, and in any other suitable system(s).

As shown in FIG. 8, an audio input is obtained at step 802. This may include, for example, the processor 120 of the electronic device 101 obtaining audio input data 202 that captures speech associated with a user of the electronic device 101 or another speaker, such as audio input data 202 captured using at least one microphone of the electronic device 101. Features of the audio input are extracted at step 804. This may include, for example, the processor 120 of the electronic device 101 using the audio feature extractor 204 to extract audio features 206 based on the audio input data 202.

The audio features are provided to a trained machine learning model at step 806. This may include, for example, the processor 120 of the electronic device 101 providing the extracted audio features 206 as inputs to the content encoder 208 and the style encoder 210. One or more content parameter predictions and one or more style parameter predictions are generated using the trained machine learning model at step 808. This may include, for example, the processor 120 of the electronic device 101 using the content encoder 208 to generate content embeddings 212, which are provided to the content decoder 216 for use in generating the one or more content parameter predictions 218. This may also include the processor 120 of the electronic device 101 using the style encoder 210 to generate style embeddings 214, which are provided to the style decoder 220 for use in generating the one or more style parameter predictions 222. The content and style embeddings 212, 214 generated and used here can represent disentangled content and style embeddings, which can be produced due to the training of the architecture 200 described above.

The one or more content parameter predictions and the one or more style parameter predictions may be used in any suitable manner. For example, the one or more content parameter predictions and the one or more style parameter predictions may be used to animate one or more avatars, identify one or more speakers, or perform one or more other functions at step 810. The specific use or uses of the content parameter prediction(s) and/or the style parameter prediction(s) can vary depending on the specific use case or application. The results of the one or more other functions can be stored, output, or used in some manner at step 812. This may include, for example, the processor 120 of the electronic device 101 outputting the animated avatar on a display 160 of the electronic device 101 or communicating information to another electronic device for presentation of the animated avatar on a display of the other electronic device. This may also or alternatively include the processor 120 of the electronic device 101 performing or initiating performance of one or more functions based on an identification of the speaker(s) associated with the audio input. Note, however, that the one or more content parameter predictions and the one or more style parameter predictions may be used to perform any other or additional function or functions as needed or desired.

Although FIG. 8 illustrates one example of a method 800 for using a trained machine learning-based approach for audio-driven avatar animation or other functions, various changes may be made to FIG. 8. For example, while shown as a series of steps, various steps in FIG. 8 may overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one processing device of an electronic device, an audio input associated with a speaker;
   extracting, using a feature extractor of a trained machine learning model, audio features from the audio input;
   generating (i) one or more content parameter predictions using content embeddings extracted by a content encoder and decoded by a content decoder of the trained machine learning model and (ii) one or more style parameter predictions using style embeddings extracted by a style encoder and decoded by a style decoder of the trained machine learning model, the content embeddings and the style embeddings based on the audio features of the audio input; and
   performing at least one of avatar animation or speaker identification based on the one or more content parameter predictions and the one or more style parameter predictions;
   wherein the trained machine learning model is trained to generate the one or more content parameter predictions and the one or more style parameter predictions using disentangled content and style embeddings; and
   wherein the trained machine learning model is configured during training to disentangle the content and style embeddings by:
     minimizing, based on loss values, differences between ground truth content parameters and content parameter predictions as generated using the content encoder and the content decoder and differences between ground truth style parameters and style parameter predictions as generated using the style encoder and the style decoder; and maximizing, based on loss values, differences between the ground truth content parameters and content parameter predictions as generated using the style encoder and the content decoder and differences between the ground truth style parameters and style parameter predictions as generated using the content encoder and the style decoder.

2. The method of claim 1, wherein the one or more content parameter predictions comprise at least one of: one or more phoneme predictions, one or more viseme predictions, one or more sub-word predictions, and one or more word predictions.

3. The method of claim 1, wherein the one or more style parameter predictions comprise at least one of: one or more emotion predictions, one or more facial expression predictions, one or more speaker identity predictions, one or more speaker gender predictions, one or more speaker accent predictions, one or more speaker pitch predictions, one or more speaker volume intensity predictions, and one or more speaker speed predictions.

4. The method of claim 1, wherein:
the feature extractor provides the audio features to the content encoder and the style encoder of the trained machine learning model;
the content encoder is configured to encode the audio features and provide the content embeddings to the content decoder, the content decoder configured to generate the one or more content parameter predictions; and
the style encoder is configured to encode the audio features and provide the style embeddings to the style decoder, the style decoder configured to generate the one or more style parameter predictions.

5. The method of claim 1, wherein the trained machine learning model comprises a deep neural network configured to provide real-time and personalized three-dimensional (3D) avatar animation.

6. An electronic device comprising:
at least one processing device configured to:
obtain an audio input associated with a speaker;
extract audio features from the audio input using a feature extractor of a trained machine learning model;
generate (i) one or more content parameter predictions using content embeddings extracted by a content encoder and decoded by a content decoder of the trained machine learning model and (ii) one or more style parameter predictions using style embeddings extracted by a style encoder and decoded by a style decoder of the trained machine learning model, the content embeddings and the style embeddings based on the audio features of the audio input; and
perform at least one of avatar animation or speaker identification based on the one or more content parameter predictions and the one or more style parameter predictions;
wherein the trained machine learning model is trained to generate the one or more content parameter predictions and the one or more style parameter predictions using disentangled content and style embeddings, and
wherein the trained machine learning model is configured during training to disentangle the content and style embeddings by:
minimizing, based on loss values, differences between ground truth content parameters and content parameter predictions as generated using the content encoder and the content decoder and differences between ground truth style parameters and style parameter predictions as generated using the style encoder and the style decoder; and
maximizing, based on loss values, differences between the ground truth content parameters and content parameter predictions as generated using the style encoder and the content decoder and differences between the ground truth style parameters and style parameter predictions as generated using the content encoder and the style decoder.

7. The electronic device of claim 6, wherein the one or more content parameter predictions comprise at least one of: one or more phoneme predictions, one or more viseme predictions, one or more sub-word predictions, and one or more word predictions.

8. The electronic device of claim 6, wherein the one or more style parameter predictions comprise at least one of: one or more emotion predictions, one or more facial expression predictions, one or more speaker identity predictions, one or more speaker gender predictions, one or more speaker accent predictions, one or more speaker pitch predictions, one or more speaker volume intensity predictions, and one or more speaker speed predictions.

9. The electronic device of claim 6, wherein:
the feature extractor is configured to provide the audio features to the content encoder and the style encoder of the trained machine learning model;
the content encoder is configured to encode the audio features and provide the content embeddings to the content decoder, the content decoder configured to generate the one or more content parameter predictions; and
the style encoder is configured to encode the audio features and provide the style embeddings to the style decoder, the style decoder configured to generate the one or more style parameter predictions.

10. The electronic device of claim 6, wherein the trained machine learning model comprises a deep neural network configured to provide real-time and personalized three-dimensional (3D) avatar animation.

11. The method of claim 1, wherein the trained machine learning model is updated by adjusting one or more weights of one or more of the content and style encoders or one or more of the content and style decoders.

12. The method of claim 1, wherein the trained machine learning model is trained using a disentangled loss function.

13. The electronic device of claim 6, wherein the trained machine learning model is updated by adjusting one or more weights of one or more of the content and style encoders or one or more of the content and style decoders.

14. The electronic device of claim 6, wherein the trained machine learning model is trained using a disentangled loss function.

15. A non-transitory machine readable medium containing instructions that when executed cause at least one processor of an electronic device to:
obtain an audio input associated with a speaker;
extract audio features from the audio input using a feature extractor of a trained machine learning model;
generate (i) one or more content parameter predictions using content embeddings extracted by a content encoder and decoded by a content decoder of the trained machine learning model and (ii) one or more style parameter predictions using style embeddings extracted by a style encoder and decoded by a style decoder of the trained machine learning model, the content embeddings and the style embeddings based on the audio features of the audio input; and perform at least one of avatar animation or speaker identification based on the one or more content parameter predictions and the one or more style parameter predictions;

wherein the trained machine learning model is trained to generate the one or more content parameter predictions and the one or more style parameter predictions using disentangled content and style embeddings; and wherein the trained machine learning model is configured during training to disentangle the content and style embeddings by:

minimizing, based on loss values, differences between ground truth content parameters and content parameter predictions as generated using the content encoder and the content decoder and differences between ground truth style parameters and style parameter predictions as generated using the style encoder and the style decoder; and maximizing, based on loss values, differences between the ground truth content parameters and content parameter predictions as generated using the style encoder and the content decoder and differences between the ground truth style parameters and style parameter predictions as generated using the content encoder and the style decoder.

16. The non-transitory machine readable medium of claim 15, wherein the one or more content parameter predictions comprise at least one of: one or more phoneme predictions, one or more viseme predictions, one or more sub-word predictions, and one or more word predictions.

17. The non-transitory machine readable medium of claim 15, wherein the one or more style parameter predictions comprise at least one of: one or more emotion predictions, one or more facial expression predictions, one or more speaker identity predictions, one or more speaker gender predictions, one or more speaker accent predictions, one or more speaker pitch predictions, one or more speaker volume intensity predictions, and one or more speaker speed predictions.

18. The non-transitory machine readable medium of claim 15, wherein:

the feature extractor is configured to provide the audio features to the content encoder and the style encoder of the trained machine learning model;

the content encoder is configured to encode the audio features and provide the content embeddings to the content decoder, the content decoder configured to generate the one or more content parameter predictions; and the style encoder is configured to encode the audio features and provide the style embeddings to the style decoder, the style decoder configured to generate the one or more style parameter predictions.

19. The non-transitory machine readable medium of claim 15, wherein the trained machine learning model comprises a deep neural network configured to provide real-time and personalized three-dimensional (3D) avatar animation.

20. The non-transitory machine readable medium of claim 4, wherein:

the trained machine learning model is trained using a disentangled loss function; and the trained machine learning model is updated by adjusting one or more weights of one or more of the content and style encoders or one or more of the content and style decoders.

* * * * *